April 29, 1969     J. W. SNYDER     3,441,019
BED WETTING ALARM AND TRAINER
Filed Nov. 19, 1965
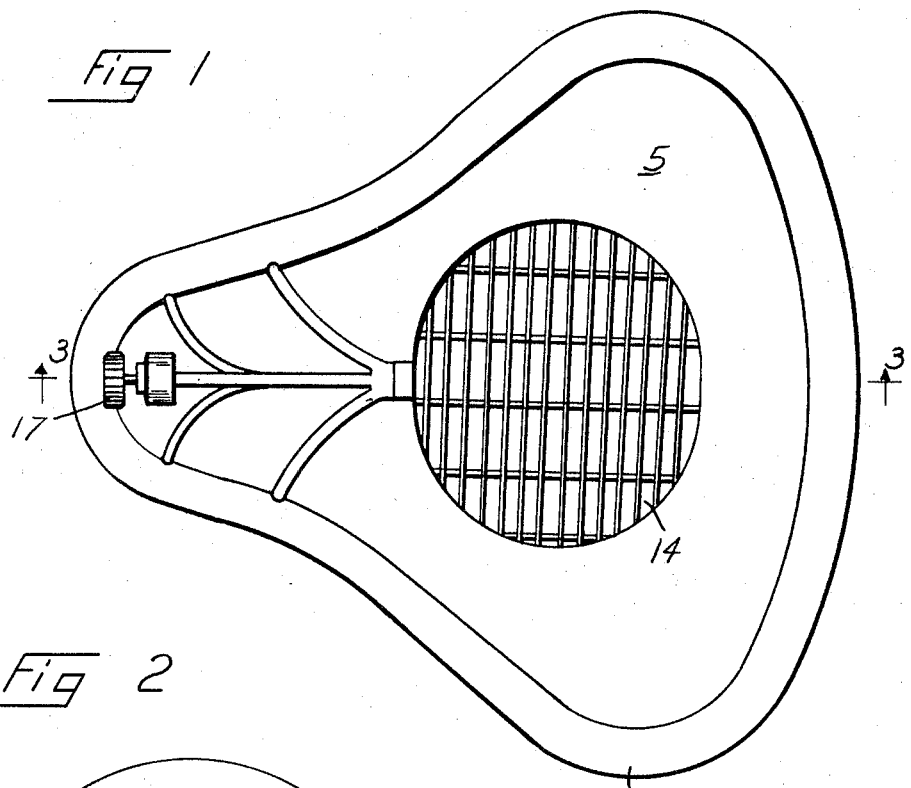
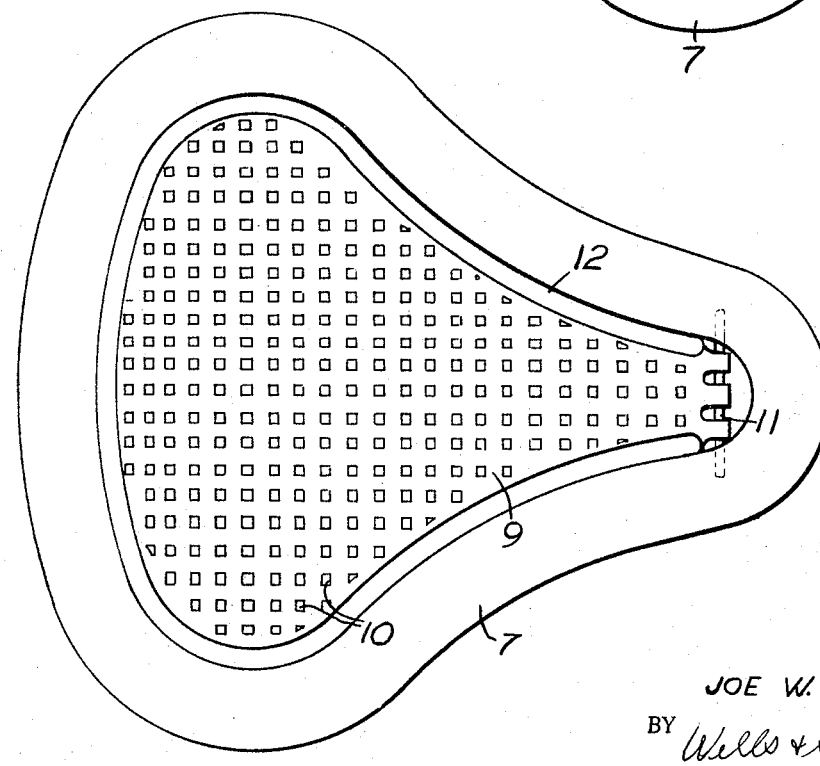
INVENTOR.
JOE W. SNYDER

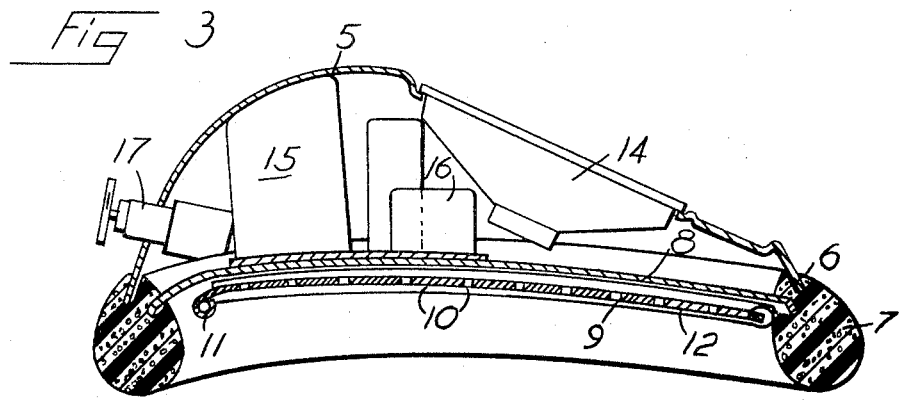
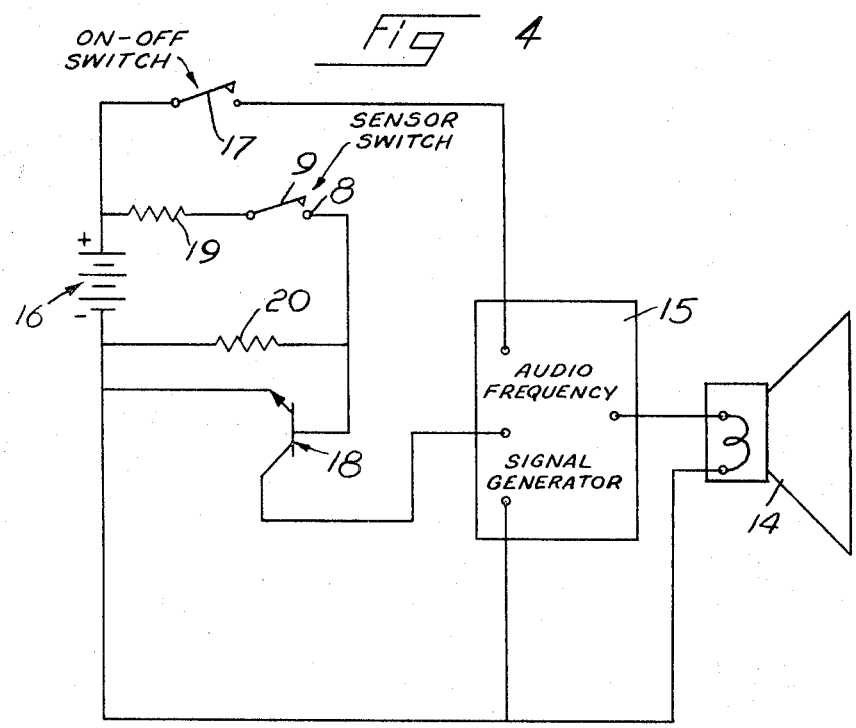

United States Patent Office 3,441,019
Patented Apr. 29, 1969

3,441,019
BED WETTING ALARM AND TRAINER
Joe W. Snyder, 515 6th Ave.,
Lewiston, Idaho 83501
Filed Nov. 19, 1965, Ser. No. 508,808
Int. Cl. A61b *19/00;* G08b *21/00*
U.S. Cl. 128—138                                    6 Claims

ABSTRACT OF THE DISCLOSURE

A bed wetting alarm and trainer for signalling undesired release of urine. Two electrically conductive surfaces are spaced by an air gap so as to be bridged by release urine. The surfaces are in an alarm circuit.

---

My invention relates to a device for use in training children who have difficulty in controlling the excretion of urine while they are asleep. This difficulty is quite widespread. It is the purpose of my invention to provide a device which can be worn by the child with comfort that gives instantaneous warning with the first drop of excretion, to awaken the child in time to avoid bed wetting, yet provides full safety and can be immediately prepared for reuse by the child.

More particularly it is the purpose of my invention to provide a signal device in a housing shaped to cover the excretion organ of the child and make comfortable contact with the body around the organ and wherein the device presents a recticulated hinged electrode plate toward the excretion source and an imperforate electrode plate spaced from and insulated from the recticulated plate and in such proximity thereto that a drop of urine on the recticulated plate can bridge the gap between the plates and close a circuit for energizing the alarm device, the housing enclosing the signal device and a battery for energizing the signal device as well as the circuit connections from the plates to the battery and signal device.

I have found that the use of this device by the child is effective in training the child to overcome the weakness and thus become able to avoid the difficulty of bed wetting while asleep.

The nature and advantages of my invention will appear more fully from the following description and the accompanying drawings wherein a preferred form of the invention is shown.

In the drawings:

FIGURE 1 is a front view of the device embodying my invention;

FIGURE 2 is a rear view of the device showing the face thereof that is directed toward the body of the wearer;

FIGURE 3 is a sectional view taken on the line 3—3 of FIGURE 1; and

FIGURE 4 is a diagrammatic view showing the circuitry and the signal elements of the device.

Referring now to the drawings, the device embodying my invention is shown as comprising a cupped housing 5 which may be formed of metal of other suitably strong and rigid material. The housing 5 has its peripheral edge 6 seated in a resilient, electrically nonconductive ring 7 which is preferably made of sponge rubber or plastic with its outer surface imperforate so it can be easily kept clean by washing. The housing 5 and the ring 7 are shaped as shown so that they fit to the body contour around the urine outlet of a child and cover this outlet. They can be held to the body in any suitable way, for example, by a properly fitted athletic supporter, "jockey" style shorts or individual straps. The essential in such device is that they be easily and quickly removable when necessary.

The open side of the housing 5 is closed by an imperforate metal plate 8 also set in the ring 7 and permanently sealed thereto. A second plate 9 overlies and is spaced from from the plate 8. The respective conductive surfaces of plate 8 and plate 9 are openly spaced from one another in such closely adjacent positions as to be capable of being bridged by droplets of urine. The plate is reticulated, i.e., provided with a multiplicity of holes or passages 10 through it, of such size that a drop of liquid on the plate 9 will pass through the openings and bridge the space between the plates 8 and 9. This second plate 9 is hinged to the housing on a pin 11. The plate 9 has its edge covered with an insulator 12 which maintains the spacing between the plates 8 and 9. This insulator may be of any suitable material such as one of the well-known semirigid plastics.

The signal equipment is located within the housing 5 behind the plate 8 and includes a speaker 14 and an audio frequency signal generator 15 in the form of a model railroad and toy siren. The signal equipment includes also a battery 16, a manual control switch 17 to turn off the siren 15, and a transistor 18, with suitable resistance elements 19 and 20. The plates 8 and 9 are indicated in the circuit at FIGURE 4 as the movable and stationary contacts of a switch.

The siren unit embodying the signal generator 16 and the speaker 14 are commercially available. Carl Cordover & Co. of Mineola, N. Y., manufactures one unit that I have used successfully. Of course, other signal devices of known construction may be used. To make the device operative the manual switch 17 is closed. Thereafter any closing of the circuit through the plates 8 and 9 will cause the siren to sound until that circiut or the switch 17 is opened again.

When the child is fitted with this, adequate instructions should be given as to how to prepare the device. Also the child should be instructed as to what to do to stop the siren when awakened, and how to reset the device for use again. The device depends upon the fact that urine is a good conductor of electricity and when it bridges the air gap between the plates 8 and 9, it establishes a conducting circuit causing the transistor 18 to be activated and complet an energizing circuit for the speaker-siren unit 14–15. This unit can be deenergized by opening the manual switch 17.

To reset the device it is only necessary to swing the hinged plate 9 out and dry it and the plate 8, using toilet tissue or other absorbent material.

The reticulate or perforated plate 9 is then closed to bring the insulator 12 against the plate 8. The device is then reapplied to the child's body and secured in place. The procedure is so simple that children of a few years age can be trained to take care of the drying and resetting. The device can be worn without discomfort by boys and girls.

It is believed that the nature and advantages of my invention will be clear from the foregoing description.

I claim:

1. A bed wetting alarm and trainer comprising a housing having one face shaped to engage a person's body around the urine discharge opening:

the outer surface of said face being of an electrically conductive material to provide one electrode plate;

a reticulated electrically conductive electrode plate normally overlying and spaced from the first plate but in proximity thereto, said plates being separated by an air gap capable of being bridged by droplets of urine, said reticulated electrode plate being movably mounted on the housing to move away from the first plate for access to the space between the plates;

said plates being electrically insulated from each other; and signalling means in said housing operable to produce a warning signal when urine bridges the space between said plates.

2. The device defined in claim 1 wherein the reticulated plate is hinged to the housing to swing toward and away from the other elecrode plate.

3. The device defined in claim 1 wherein the housing has therein a battery, a speaker and an audio frequency generator operable when receiving current from said battery to operate the speaker, and wherein a short circuit across said electrode plates directs current from said battery to the generator.

4. In a bed wetting alarm and trainer to be worn on the person:
   a first plate having a first electrically conductive surface adapted to be positioned outwardly adjacent to and facing the person;
   a second apertured plate having a second electrically conductive surface, the surface configuration of the second conductive surface being complementary to that of said first conductive surface;
   said second plate being movably mounted to said first plate with the respective first and second conductive surfaces thereof overlying and facing one another, the respective first and second conductive surfaces being openly spaced from one another and separated by an air gap in such closely adjacent position as to be capable of being bridged by droplets of urine, the respective first and second conductive surfaces being normally electrically insulated from one another;
   and signalling circuit means including said first and second conductive surfaces for producing a warning signal responsive to bridging of the electrically conductive surfaces by droplets of urine.

5. An apparatus as set out in claim 4 wherein the first plate comprises one wall of a sealed housing containing said signalling means.

6. An apparatus as set out in claim 5 wherein said signalling means comprises:
   a battery;
   a speaker;
   and an audio frequency generator operable when receiving current from said battery to operate the speaker;
   said conductive surfaces of said first and second plates being wired in an open series circuit across said battery to said audio frequency generator, said circuit being completed by the bridging of the space separating said electrically conductive surfaces by an electrically conductive liquid.

References Cited

UNITED STATES PATENTS

| 2,046,080 | 6/1936 | McClellan. | |
| 2,874,695 | 2/1959 | Vaniman | 128—138 |

FOREIGN PATENTS

| 232,331 | 2/1961 | Australia. |
| 549,869 | 8/1956 | Belgium. |

JOHN W. CALDWELL, *Primary Examiner.*

D. K. MYER, *Assistant Examiner.*

U.S. Cl. X.R.

200—61.5; 340—235